(12) United States Patent
Chen et al.

(10) Patent No.: US 9,134,767 B2
(45) Date of Patent: Sep. 15, 2015

(54) STRUCTURE OF PLANETARY TYPE DUAL-SHAFT HINGE

(71) Applicant: Chin-Hsing Horng, Kueishan Hsiang, Taoyuan (TW)

(72) Inventors: Ching-Yao Chen, Taoyuan (TW); Shih-Pin Yang, Taoyuan (TW)

(73) Assignee: Chin-Hsing Horng, Taoyuan (TW)

( * ) Notice: Subject to any disclaimer, the term of this patent is extended or adjusted under 35 U.S.C. 154(b) by 41 days.

(21) Appl. No.: 13/961,496

(22) Filed: Aug. 7, 2013

(65) Prior Publication Data

US 2015/0040353 A1  Feb. 12, 2015

(51) Int. Cl.
*G06F 1/16* (2006.01)
*E05D 3/12* (2006.01)
*H04M 1/02* (2006.01)

(52) U.S. Cl.
CPC .............. *G06F 1/1681* (2013.01); *E05D 3/12* (2013.01); *E05Y 2900/606* (2013.01); *H04M 1/022* (2013.01); *Y10T 16/547* (2015.01)

(58) Field of Classification Search
CPC .............. Y10T 16/547; Y10T 16/5474; Y10T 16/5403; Y10T 16/557; E05D 3/06; E05D 3/12; E05Y 2900/606; H04M 1/022; G06F 1/1616; G06F 1/1681
USPC ............... 16/366, 368, 337, 386; 361/679.27, 361/679.06; 379/433.13; 455/575.3
See application file for complete search history.

(56) References Cited

U.S. PATENT DOCUMENTS

| | | | | |
|---|---|---|---|---|
| 8,296,905 | B2 * | 10/2012 | Zhang et al. | 16/366 |
| 8,578,561 | B2 * | 11/2013 | Chuang | 16/354 |
| 8,627,546 | B2 * | 1/2014 | Zhang et al. | 16/368 |
| 2008/0307608 | A1 * | 12/2008 | Goto | 16/366 |
| 2009/0000062 | A1 * | 1/2009 | Yamanami | 16/366 |
| 2011/0157780 | A1 * | 6/2011 | Wang et al. | 361/679.01 |
| 2011/0289728 | A1 * | 12/2011 | Wang et al. | 16/337 |
| 2013/0016492 | A1 * | 1/2013 | Wang et al. | 361/820 |

FOREIGN PATENT DOCUMENTS

TW          413776 U  * 10/2011

* cited by examiner

*Primary Examiner* — William Miller

(57) ABSTRACT

A planetary type dual-shaft hinge includes a female shaft, a male shaft set including first and second male shafts respectively inserted through the female shaft, and a transmission mechanism including first and second transmission members respectively connected to the first and second male shafts and a link pivotally coupled between the first and second transmission members in such a manner that the pivoting points between the link and the first and second transmission members are disposed at two opposite sides relative to the central axes of the first and second transmission members so that when the user opens the cover member of the flip-up electronic device in which the hinge is used, the first male shaft is turned around the second male shaft to smoothen the movement of the cover member.

5 Claims, 6 Drawing Sheets

STRUCTURE OF PLANETARY TYPE DUAL-SHAFT HINGE

BACKGROUND OF THE INVENTION

1. Field of the Invention

The present invention relates to hinge technology, and more particularly to an improved structure of planetary type dual-shaft hinge, which provides a variable radius in a flip-up electronic device by using a female shaft to match with two male shafts so that when the cover member of the flip-up electronic device is opened from the base member thereof, the female shaft and the male shafts are rotated to smoothen the pivoting motion of the cover member, enabling the cover member and base member of the flip-up electronic device to be kept on one same plane after the flip-up electronic device is fully opened.

2. Description of the Related Art

Hinges are intensively used in flip-up mobile electronic devices such as notebooks, smart phones, and etc. to pivotally connect a base member and a cover member together, allowing only a limited angle of rotation between them. Some flip-up mobile electronic devices allow the cover member to be turned from the top side of the base member to the bottom side thereof, enabling the flip-up mobile electronic devices to be used as a tablet computer.

A hinge for this application is a dual-shaft design. Taiwan Patent Publication Number M413776 discloses a dual-shaft hinge design. According to this design, first coupling means and second coupling means are provided at two opposite sides of connection plate means; the first coupling means provides a first opening at an end edge thereof adjacent to one side of connection plate means; the second coupling means provides a second opening at an end edge thereof adjacent to an opposite side of connection plate means; a first male shaft and a second male shaft are respectively mounted in the first coupling means and the second coupling means. When opening a cover member from a base member of a flip-up electronic device using the hinge, the first male shaft and the second male shaft are rotated one after another in a proper order, allowing the cover member to be easily lifted with less effort. However, when reversing the cover member relative to the base member to close the flip-up electronic device, mush resisting force will be produced. According to this conventional design, the first coupling means and the second coupling means can wear quickly with use, resulting in elastic fatigue losing and losing their functions to rotate in sequence.

SUMMARY OF THE INVENTION

The present invention has been accomplished under the circumstances in view. It is the main object of the present invention to provide a planetary type dual-shaft hinge for use in a flip-up electronic device, which uses a transmission mechanism to couple a first male shaft and a second male shaft in a female shaft, enabling the first male shaft to be turn around the second male shaft when the user opens the cover member of the flip-up electronic device from the base member, smoothening the operation.

To achieve this and other objects of the present invention, a planetary type dual-shaft hinge of the invention comprises a female shaft, a male shaft set and a transmission mechanism. The female shaft comprises a shaft body defining a first barrel and a second barrel in a parallel manner. The male shaft set comprises a first male shaft rotatably inserted through the first barrel of the female shaft, and a second male shaft rotatably inserted through the second barrel of the female shaft. The first male shaft comprises a first hinge plate located at one end thereof. The first hinge plate defines a first mounting portion. The second male shaft comprises a second hinge plate located at one end thereof. The second hinge plate defines a second mounting portion. The transmission mechanism comprises a first transmission member, a second transmission member and a link. The first transmission member is fixedly connected to an opposite end of the first male shaft opposite to the first hinge plate. The second transmission member is fixedly connected to an opposite end of the second male shaft opposite to the second hinge plate. The link has two opposite ends thereof respectively pivotally coupled to the first transmission member and the second transmission member. The first transmission member and the second transmission member are disposed at one same side relative to the female shaft. Further, the pivoting point between the link and the first transmission member is disposed within the area between the central axis of the first transmission member and the first mounting portion. Further, the pivoting point between the link and the second transmission member is disposed at one lateral side relative to the central axis of the second transmission member and remote from the second mounting portion.

DETAILED DESCRIPTION OF THE PREFERRED EMBODIMENT

Figure 1:
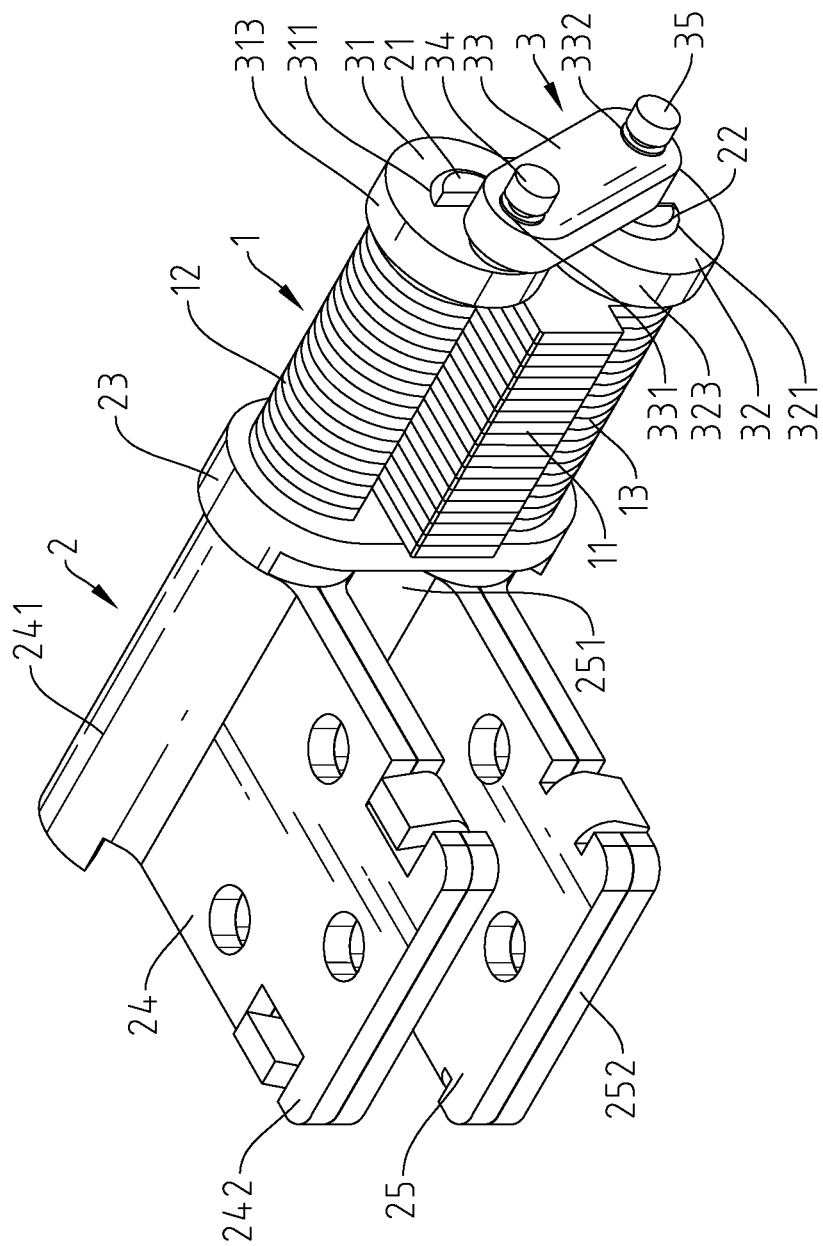
FIG. 1 is an elevational view of a planetary type dual-shaft hinge in accordance with the present invention.
Figure 2:
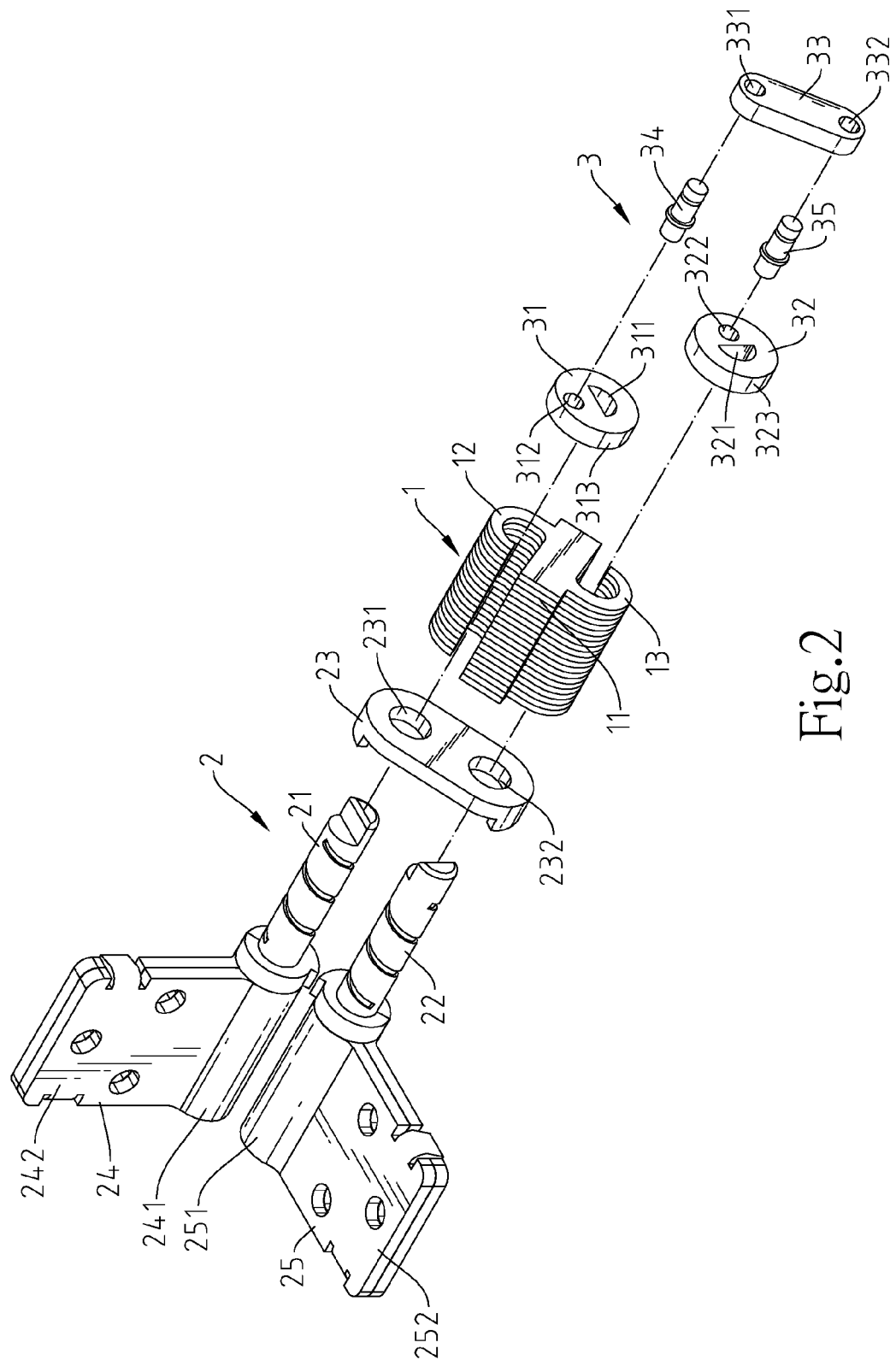
FIG. 2 is an exploded view of the planetary type dual-shaft hinge in accordance with the present invention.

Referring to FIGS. 1 and 2, a planetary type dual-shaft hinge in accordance with the present invention is shown. The planetary type dual-shaft hinge comprises a female shaft 1, a male shaft set 2, and a transmission mechanism 3.

The female shaft 1 comprises a shaft body 11 defining a first barrel 12 and a second barrel 13 in a parallel manner.

The male shaft set 2 comprises a first male shaft 21, a second male shaft 22, and a constraint plate 23. The constraint plate 23 defines a first constraint hole 231 and a second constraint hole 232. Further, the constraint plate 23 is disposed at one side relative to the female shaft 1. The first male shaft 21 is inserted through the first constraint hole 231 of the constraint plate 23 and the first barrel 12 of the female shaft 1. The second male shaft 22 is inserted through the second constraint hole 232 of the constraint plate 23 and the second barrel 13 of the female shaft 1. Further, the first male shaft 21 and the second male shaft 22 are respectively affixed to a first hinge plate 24 and a second hinge plate 25. The first hinge plate 24 comprises a first connection portion 241 connected to the first male shaft 21, and a first mounting portion 242 extended from the periphery of the first connection portion 241. The second hinge plate 25 comprises a second connection portion 251 connected to the second male shaft 22, and a second mounting portion 252 extended from the periphery of the second connection portion 251.

The transmission mechanism 3 comprises a first transmission member 31, a second transmission member 32, a link 33, a first coupling shank 34, and a second coupling shank 35. The first transmission member 31 is a circular plate member, defining a first non-circular center mounting hole 311 attached to one end of the first male shaft 21 remote from the first hinge plate 24 for synchronous rotation with the first male shaft 21, a first pivot hole 312 disposed at one side relative to the first non-circular center mounting hole 311 in a parallel manner, and a first bearing surface 313 extending around the periphery thereof. The second transmission member 32 is a circular plate member, defining a second non-circular center mounting hole 321 attached to one end of the second male shaft 22 remote from the second hinge plate 25 for synchronous rotation with the second male shaft 22, a second pivot hole 322 disposed at one side relative to the second non-circular center mounting hole 321 in a parallel manner, and a second t bearing surface 323 extending around the periphery thereof. Further, the combined length of the radius of the first transmission member 31 and the radius of the second transmission member 32 is equal to the distance between the central axis of the first shaft 21 and the central axis of the second male shaft, enabling the first bearing surface 313 of the first transmission member 31 to be abutted against the second bearing surface 323 of the second transmission member 32. The link 33 is an elongated plate member defining a first through hole 331 and a second through hole 332. The first coupling shank 34 has its two opposite ends respectively pivotally coupled to the first pivot hole 312 of the first transmission member 31 and the first through hole 331 of the link 33. The second coupling shank 35 has its two opposite ends respectively pivotally coupled to the second pivot hole 322 of the second transmission member 32 and the second through hole 332 of the link 33. Because the first pivot hole 312 and the second pivot hole 322 are respectively disposed at one side relative to the first non-circular center mounting hole 311 and the second non-circular center mounting hole 321, the pivoting point between the link 33 and the first transmission member 31 is deviated from the connection point between the first transmission member 31 and the first male shaft 21, and the pivoting point between the link 33 and the second transmission member 32 is deviated from the connection point between the second transmission member 32 and the second male shaft 22.

Figure 3:
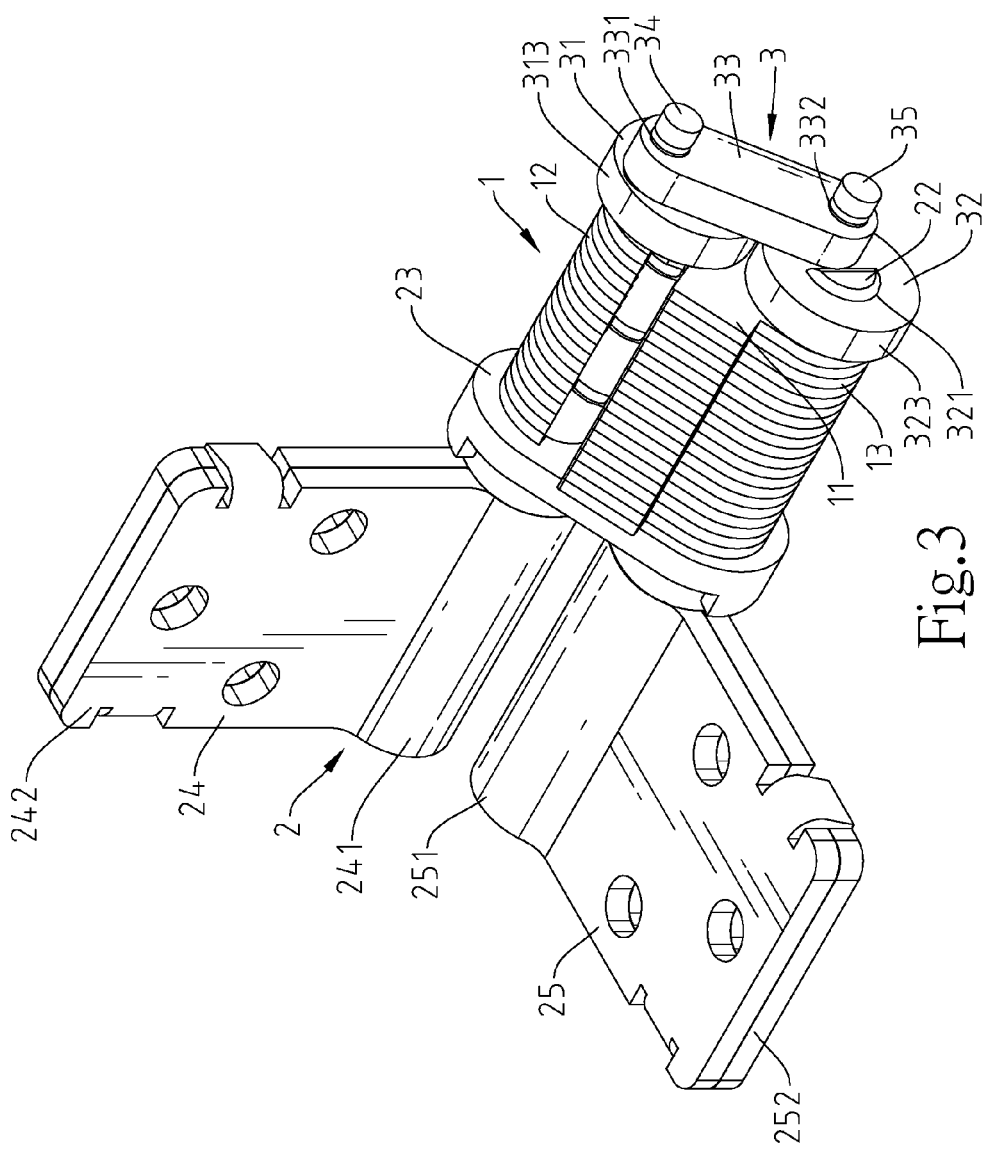
FIG. 3 corresponds to FIG. 1, illustrating the angular position between first hinge plate and the second hinge plate changed.
Figure 4:
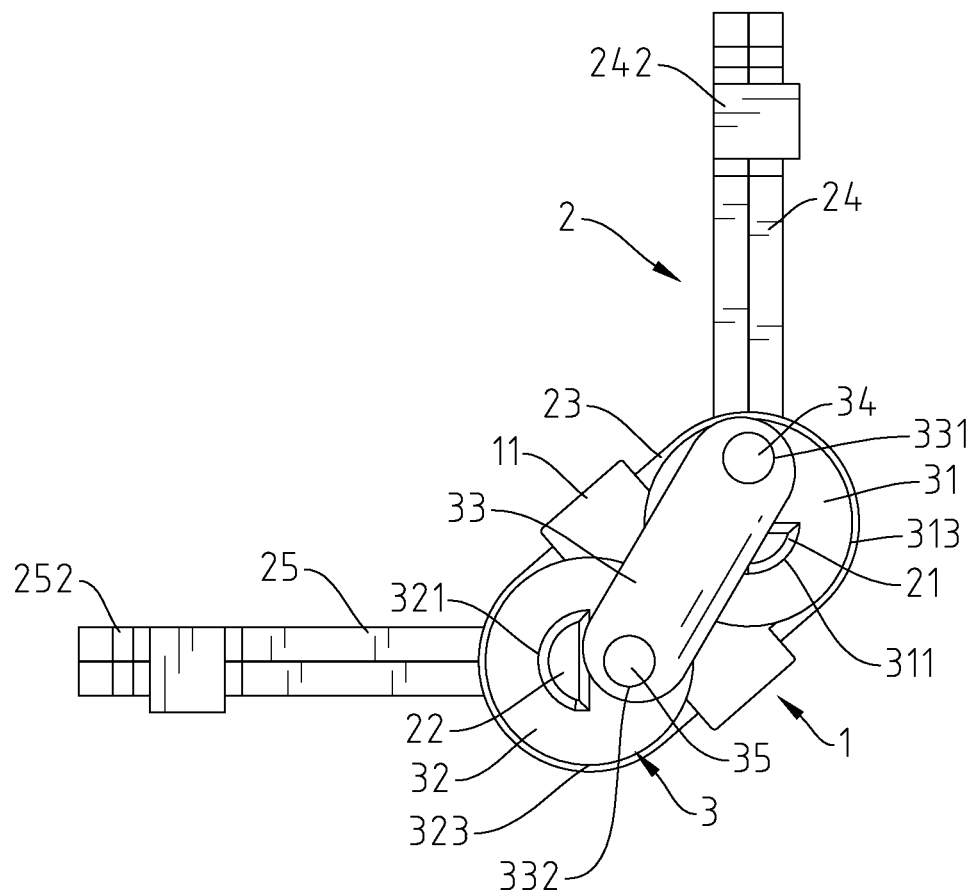
FIG. 4 is a schematic side plain view of the planetary type dual-shaft hinge in accordance with the present invention.

Referring to FIGS. 3 and 4 and FIG. 2 again, when biasing the first hinge plate 24 to rotate the first male shaft 21, the first male shaft 21 drives the first transmission member 31 to rotate. Because the pivoting point between the link 33 and the first transmission member 31 is disposed within the area between the central axis of the first transmission member 31 and the first mounting portion 242 and the pivoting point between the link 33 and the second transmission member 32 is disposed at one lateral side relative to the central axis of the second transmission member 32 and far from the second mounting portion 252, rotating the first transmission member 31 can drive the first coupling shank 34 to push the link 33. Further, because the two opposite ends of the link 33 are respectively pivotally coupled to the first transmission member 31 and the second transmission member 32, the thrust force produced during rotary motion of the first coupling shank 34 can drive the first transmission member 31 to turn about the second transmission member 32, causing the first male shaft 21 to rotate.

Figure 5:
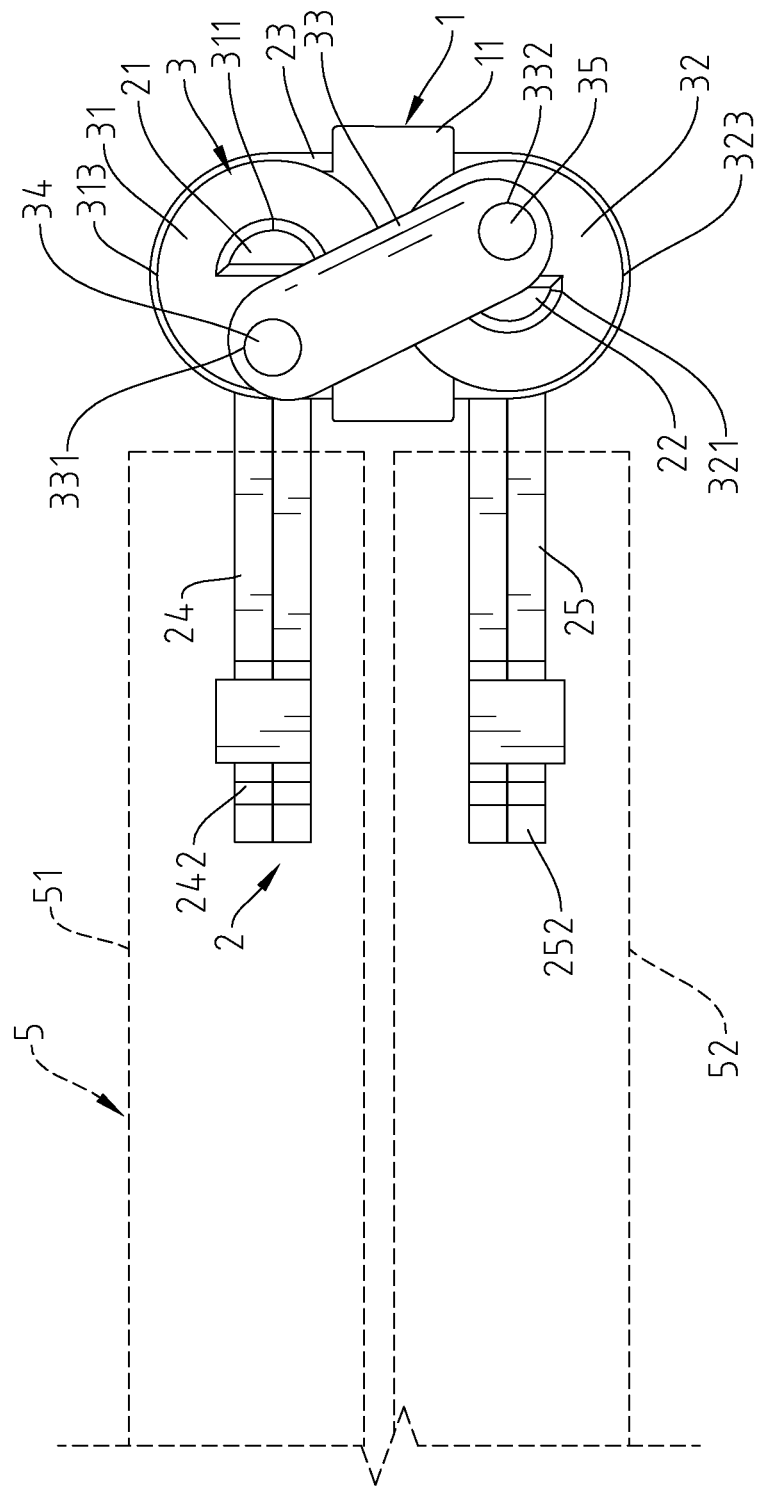
FIG. 5 is a schematic applied view of the present invention, illustrating the first hinge plate and second hinge plate of the planetary type dual-shaft hinge respectively affixed to a cover member and a base member of a flip-up electronic device.
Figure 6:
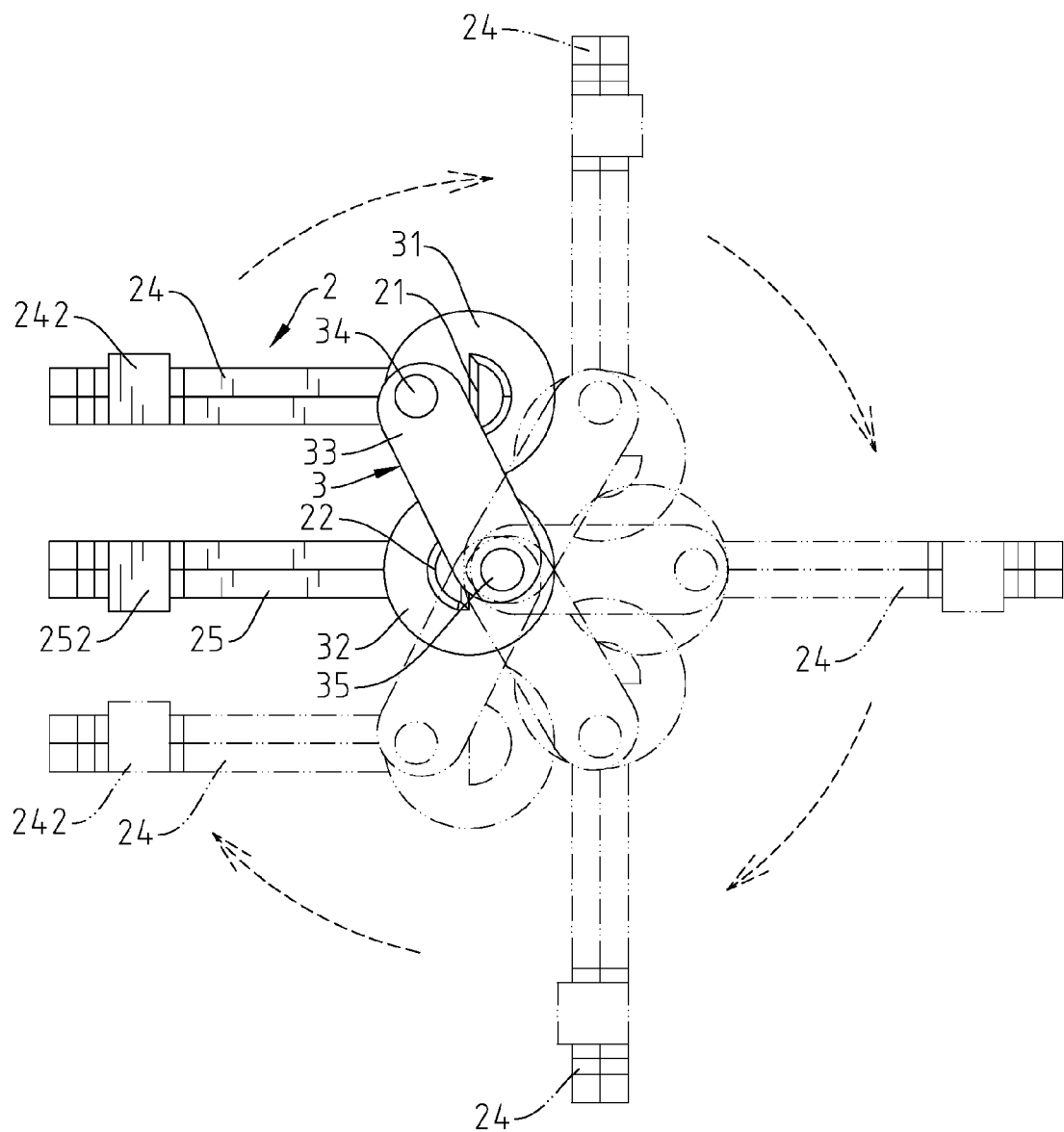
FIG. 6 corresponds to FIG. 5, illustrating the cover member of the flip-up electronic device opened from the base member and the first transmission member turned around the second transmission member.

Referring to FIGS. 5 and 6 and FIG. 2 again, when using the planetary type dual-shaft hinge in a flip-up electronic device 5, the first mounting portion 242 of the first hinge plate 24 and the second mounting portion 252 of the second hinge plate 25 are respectively affixed to cover member 51 and base member 52 of the flip-up electronic device 5. When opening the cover member 51 from the base member 52, the first transmission member 31 will be turned about the second transmission member 32.

In the present preferred embodiment, the first transmission member 31 is turned around the second transmission member 32 from the top side to the bottom side through 180-degrees angle, and the pivoting point between the link 33 and the first transmission member 31 is turned around the first male shaft 21 through 360-degrees angle, allowing the cover member 51 of the flip-up electronic device 5 to be turned from the top side of the base member 52 to the bottom side thereof. When the cover member 51 is turned to one lateral side of the base member 52 and kept on the same plane relative to the base member 52, the pivoting point between the link 33 and the first transmission member 31 is turned around the first male shaft 21 through 180-degrees angle, and the first transmission member 31 is turned around the second transmission member 32 through 90-degrees angle. Further, because the first bearing surface 313 of the first transmission member 31 is abutted against the second bearing surface 323 of the second transmission member 32, the second bearing surface 323 of the second transmission member 32 provides support to the first transmission member 31 during turning of the first transmission member 31 around the second transmission member 32, smoothening the motion of the first transmission member 31.

As stated above, the key technology of the present invention to eliminate the drawbacks of conventional designs is that the female shaft 1 accommodates the first male shaft 21, which is affixed to the first transmission member 31, and the second male shaft 221, which is affixed to the second transmission member 32; the link 33 is pivotally coupled with the first transmission member 31 and the second transmission member 32; the pivoting point between the link 33 and the first transmission member 31 is disposed within the area between the central axis of the first transmission member 31 and the first mounting portion 242 of the first hinge plate 24 of the male shaft set 2; the pivoting point between the link 33 and the second transmission member 32 is disposed at one lateral side relative to the central axis of the second transmission member 32 and far from the second mounting portion 252 of the second hinge plate 25 of the male shaft set 2. Thus, rotating the first male shaft 21 can drive the first transmission member 31 to turn around the second transmission member 32 smoothly, eliminating the drawbacks of the prior art design. The pivoting point between the link 33 and the first transmission member 31 and the pivoting point between the link 33 and the second transmission member 32 are disposed in reversed directions relative to the central axes of the first male shaft 21 and second male shaft 22 so that the cover member 51 and the base member 52 can be kept on the same plane after turning of the cover member 51 through 180-degrees angle relative to the base member 52, avoiding any elevation difference between the cover member 51 and the base member 52.

Although a particular embodiment of the invention has been described in detail for purposes of illustration, various modifications and enhancements may be made without departing from the spirit and scope of the invention.

What the invention claimed is:

1. A dual-shaft hinge, comprising a female shaft, a male shaft set and a transmission mechanism, wherein:

said female shaft comprises a shaft body defining a first barrel and a second barrel in a parallel arrangement;

said male shaft set comprises a first male shaft rotatably inserted through said first barrel of said female shaft, and a second male shaft rotatably inserted through said second barrel of said female shaft, said first male shaft comprising a first hinge plate located at an end thereof, said first hinge plate defining a first mounting portion, said second male shaft comprising a second hinge plate located at an end thereof, said second hinge plate defining a second mounting portion;

said transmission mechanism comprises a first transmission member, a second transmission member, a first coupling shank, a second coupling shank and a link, said first transmission member being fixedly connected to an opposite end of said first male shaft opposite to said first hinge plate, said second transmission member being fixedly connected to an opposite end of said second male shaft opposite to said second hinge plate, said link having two opposite ends thereof respectively pivotally coupled to said first transmission member and said second transmission member, said first transmission member and said second transmission member being disposed at one same side relative to said female shaft, the first coupling shank providing a first pivoting point between said link and said first transmission member and being disposed off-center from a central axis of said first transmission member, the second coupling shank providing a second pivoting point between said link and said second transmission member and being disposed off-center from a central axis of said second transmission member.

2. The dual-shaft hinge as claimed in claim 1, wherein said first transmission member defines therein a first non-circular center mounting hole; said first male shaft has the opposite end thereof fixedly fastened to said first non-circular center mounting hole of said first transmission member; said second transmission member defines therein a second non-circular center mounting hole; said second male shaft has the opposite end thereof fixedly fastened to said second non-circular center mounting hole of said second transmission member.

3. The dual-shaft hinge as claimed in claim 1, wherein said first transmission member further defines a first pivot hole; said second transmission member further defines a second pivot hole; said link comprises a first through hole and a second through hole respectively disposed at the two opposite ends thereof; said first coupling shank has two opposite ends thereof respectively pivotally connected to said first pivot hole and said first through hole; and said second coupling shank has two opposite ends thereof respectively pivotally connected to said second pivot hole and said second through hole.

4. The dual-shaft hinge as claimed in claim 1, wherein said male shaft set further comprises a constraint plate disposed at one side relative to said female shaft and opposite to said first transmission member and said second transmission member, said constraint plate comprising a first constraint hole and a second constraint hole respectively located at two opposite ends thereof; said first male shaft is inserted through said first constraint hole of said constraint plate into said first barrel of said female shaft; said second male shaft is inserted through said second constraint hole of said constraint plate into said second barrel of said female shaft.

5. The dual-shaft hinge as claimed in claim 1, wherein said first transmission member is a circular plate member defining a first bearing surface around a periphery thereof; said second transmission member is a circular plate member defining a second bearing surface around a periphery thereof and rotatably abutted against said first bearing surface of said first transmission member, a combined length of a radius of said first transmission member and a radius of said second transmission member is equal to a distance between the central axis of said first male shaft and the central axis of said second male shaft.

* * * * *